(12) United States Patent
Chen

(10) Patent No.: US 7,407,620 B2
(45) Date of Patent: Aug. 5, 2008

(54) METHOD FOR MAKING BICYCLE FRAMES

(76) Inventor: Yu-Hsuan Chen, 1F, No. 94-2, Sec. 3, Taichung Port Road, Situn District, Taichung City (TW)

( * ) Notice: Subject to any disclaimer, the term of this patent is extended or adjusted under 35 U.S.C. 154(b) by 216 days.

(21) Appl. No.: 11/237,735

(22) Filed: Sep. 29, 2005

(65) Prior Publication Data
US 2007/0069413 A1    Mar. 29, 2007

(51) Int. Cl.
B29C 70/44    (2006.01)
B29D 12/00   (2006.01)

(52) U.S. Cl. .................. 264/516; 264/573; 264/103; 264/258

(58) Field of Classification Search .............. 264/516, 264/573, 103, 258
See application file for complete search history.

(56) References Cited

U.S. PATENT DOCUMENTS 5,368,804 A * 11/1994 Hwang et al. ............... 264/258

\* cited by examiner

*Primary Examiner*—Suzanne E. McDowell
(74) *Attorney, Agent, or Firm*—Banger Shia

(57) ABSTRACT

A method for making bicycle frames includes a step of preparing a seat tube and a head tube and both of which are then put in concavities of two first movable mold parts on a base board. A top tube and a down tube are prepared by carbon-fiber sheets and connected between the seat tube and the head tube. Two connection ends made by carbon-fiber sheets are connected to the seat tube. Two second movable mold parts are mounted to the first movable mold parts and air is then blown into the top tube, down tube and the two connection ends to inflate the carbon-fiber sheets to contact against inner peripheries of the concavities under high temperature and pressure to let the carbon-fiber sheets be solidified.

2 Claims, 7 Drawing Sheets

METHOD FOR MAKING BICYCLE FRAMES

FIELD OF THE INVENTION

The present invention relates to a method for making bicycle frames with smaller molds.

BACKGROUND OF THE INVENTION

A conventional method for making an integral bicycle frame generally requires a mold set including an upper mold and a lower molds and each of which has concavities so that the metal bicycle frames such as aluminum frames are formed in the concavities. However, the bicycle frames requires a large mold set and the cost of the mold set is expensive. The bicycle frames may have different sizes and each size needs a mold set so that the expense for the mold sets of different sizes is a heavy load for the manufacturers.

The present invention intends to provide a method for making a bicycle frame with movable mold parts which can be arranged at desired position so as to manufacture the bicycle frames of different sizes.

SUMMARY OF THE INVENTION

The present invention relates to a method for making bicycle frames and the method comprises the following steps:

a step of preparing material: preparing a seat tube and a head tube;

a step of positioning movable mold parts on base board: arranging two first movable mold parts on the base board and each first movable mold part having concavities, the seat tube and the head tube received in the concavities of the two first movable mold parts;

a step of wrapping: wrapping carbon-fiber sheets into a top tube and a down tube, connecting the top tube and the down tube between the seat tube and the head tube, wrapped carbon-fiber sheets to the seat tube to form two connection ends, and a step of formation: mounting two second movable mold parts to the first movable mold parts and the second movable mold parts having concavities which are located in correspondence with the concavities in the first movable mold parts, blowing air into the top tube, down tube and the two connection ends to inflate the carbon-fiber sheets to contact against inner peripheries of the concavities under high temperature and pressure, the carbon-fiber sheets being solidified.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
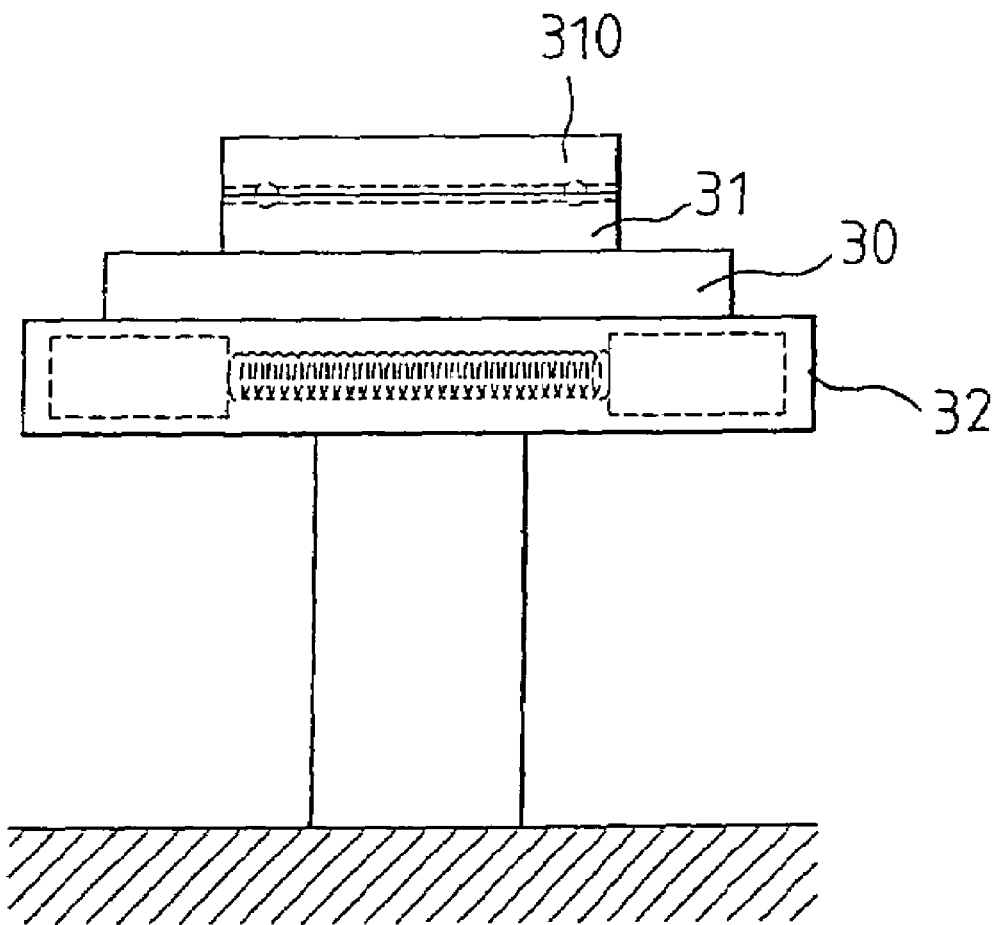
FIG. 1 is a side view to show the mold set used in the method of the present invention.
Figure 2:
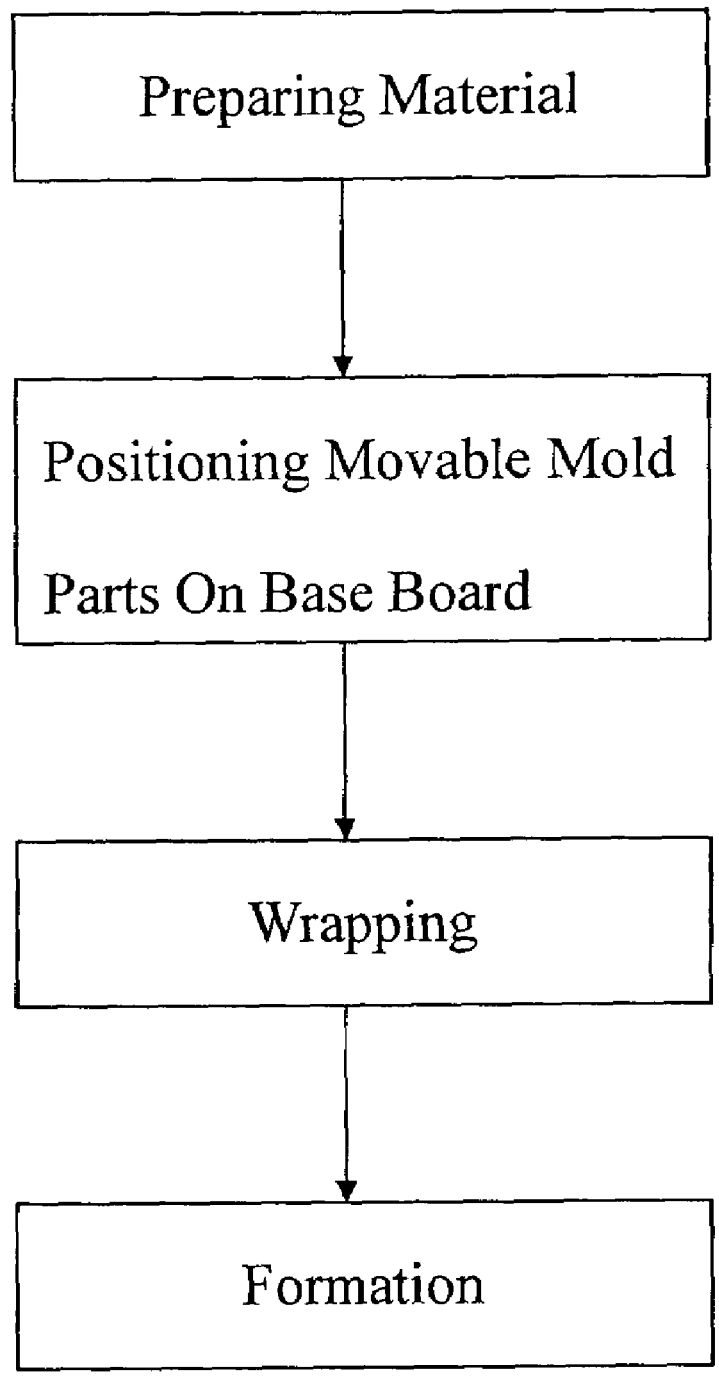
FIG. 2 shows steps of the method of the present invention.
Figure 3:
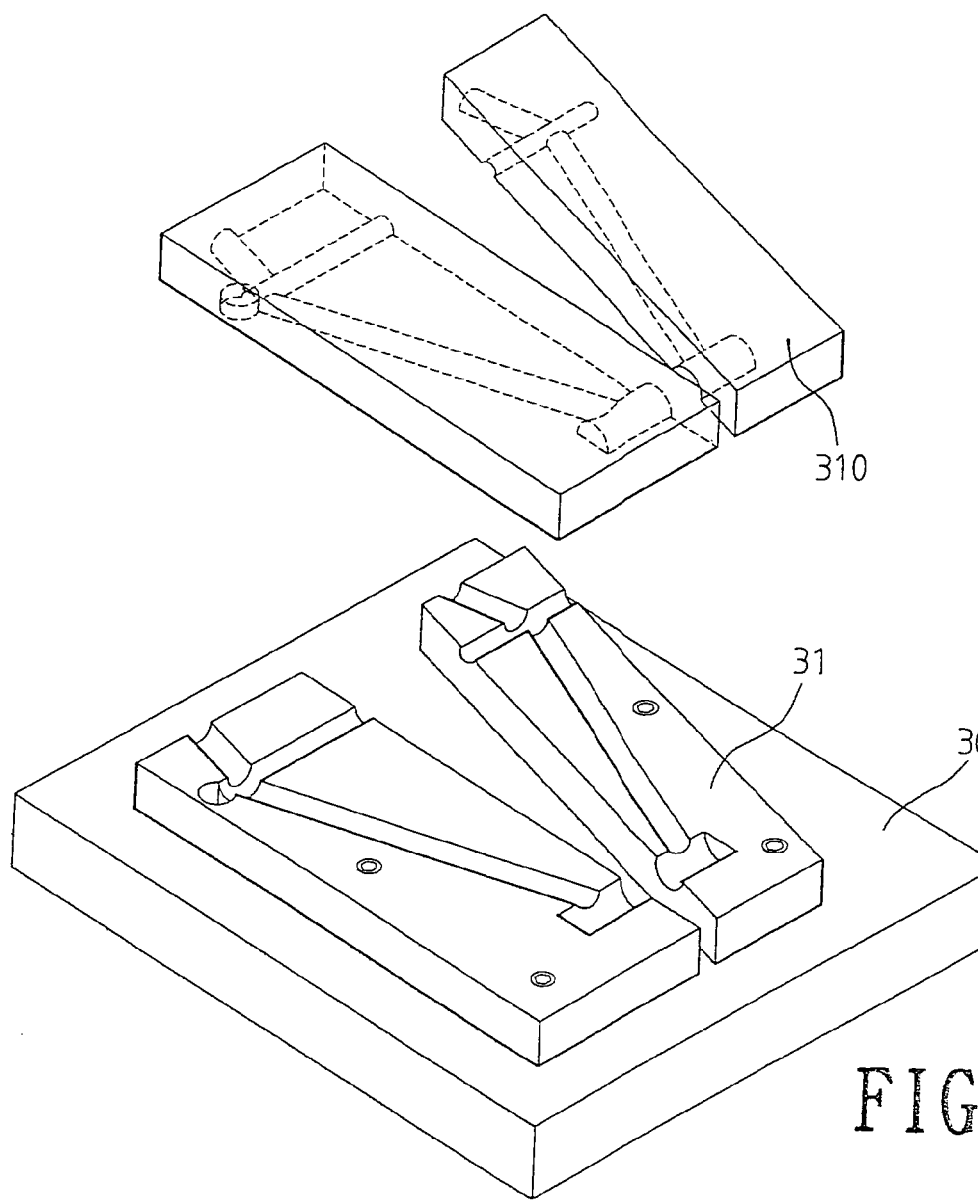
FIG. 3 is an exploded view to show the mold parts of the method of the present invention.
Figure 4:
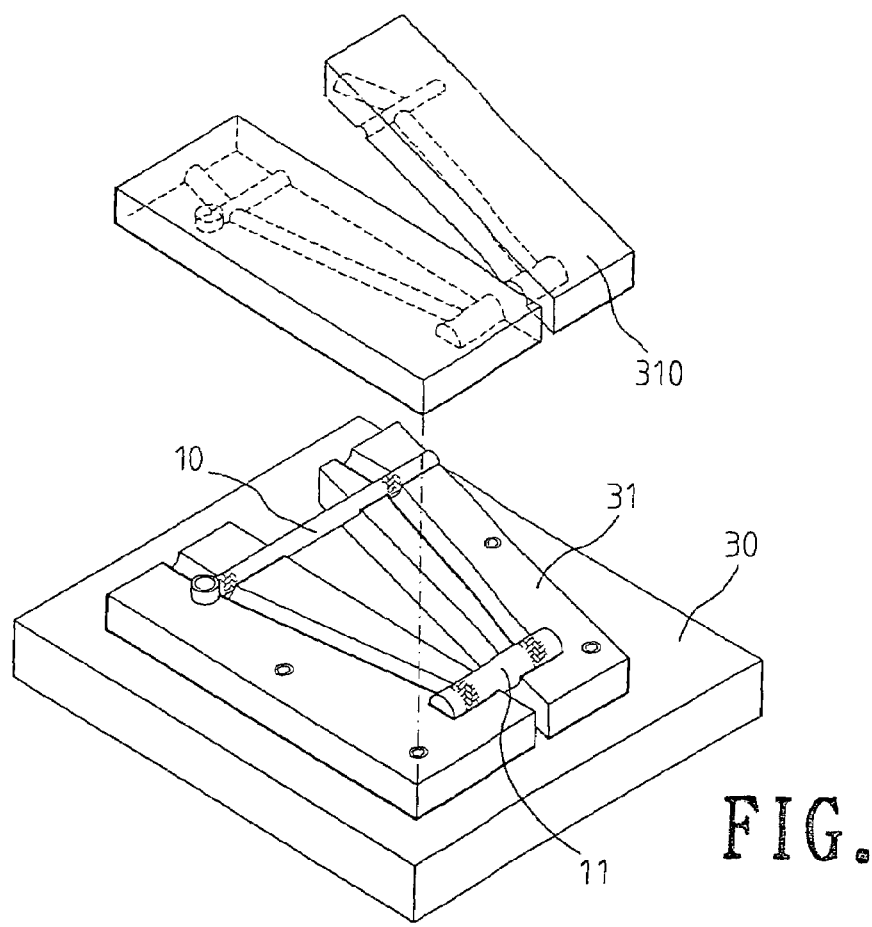
FIG. 4 shows the seat tube and the head tube are put in the concavities in the two first movable parts.
Figure 5:
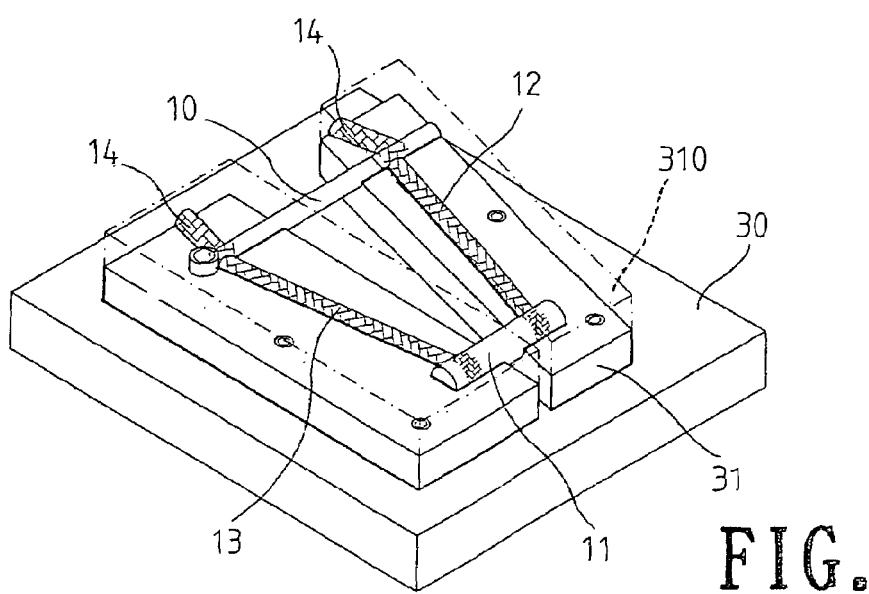
FIG. 5 shows a top tube and a down tube made by carbon-fiber sheets are connected between the seat tube and the head tube.
Figure 6:
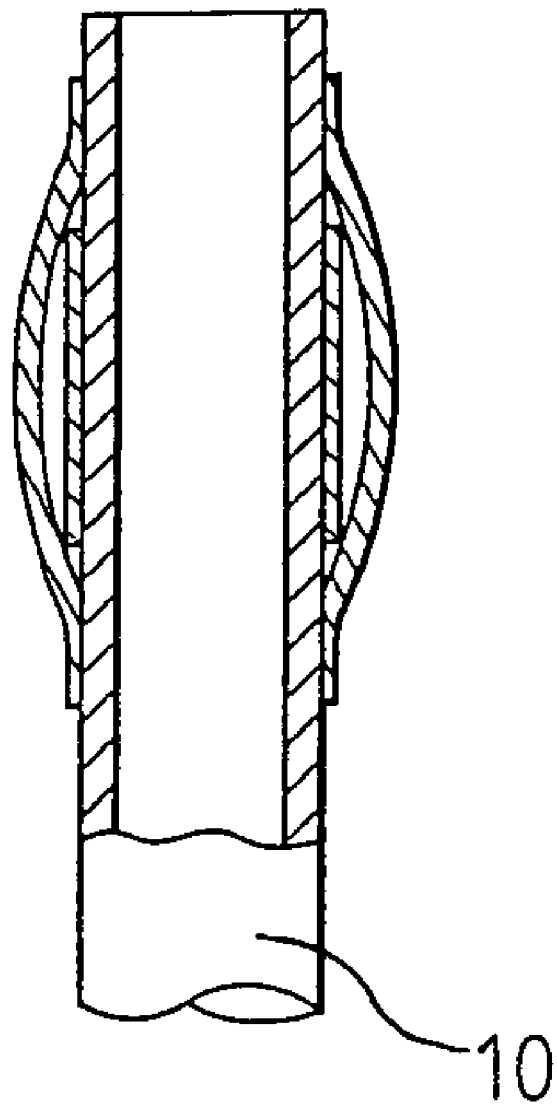
FIG. 6 shows the carbon-fiber sheets are connected to the seat tube.

Referring to FIGS. 1 to 5, the method of the present invention for making a bicycle frame comprises the following steps:

a step of preparing material: preparing a seat tube 10 and a head tube 11;

a step of positioning movable mold parts 31 on base board 30: arranging two first movable mold parts 31 on the base board 30 and each first movable mold part 31 having concavities, the seat tube 10 and the head tube 11 received in the concavities of the two first movable mold parts 31;

a step of wrapping: wrapping carbon-fiber sheets into a top tube 12 and a down tube 13, connecting the top tube 12 and the down tube 13 between the seat tube 10 and the head tube 11, wrapped carbon-fiber sheets to the seat tube 10 to form two connection ends 14 as shown in FIG. 6, and a step of formation: mounting two second movable mold parts 310 to the first movable mold parts 31 and the second movable mold parts 310 having concavities which are located in correspondence with the concavities in the first movable mold parts 31, blowing air into the top tube 12, down tube 13 and the two connection ends 14 to inflate the carbon-fiber sheets to contact against inner peripheries of the concavities under high temperature and pressure, the carbon-fiber sheets being solidified.

It is noted that the base board 30 is put on a support board 32 which has a heating member received therein and can be lifted or lowered by hydraulic system. In this embodiment, the seat tube 10 and the head tube 11 are made by aluminum and two ends of the each of the seat tube 10 and two ends of the head tube 11 are respectively received in the two first movable mold parts 31 and the two second movable mold parts 310.

Figure 7:
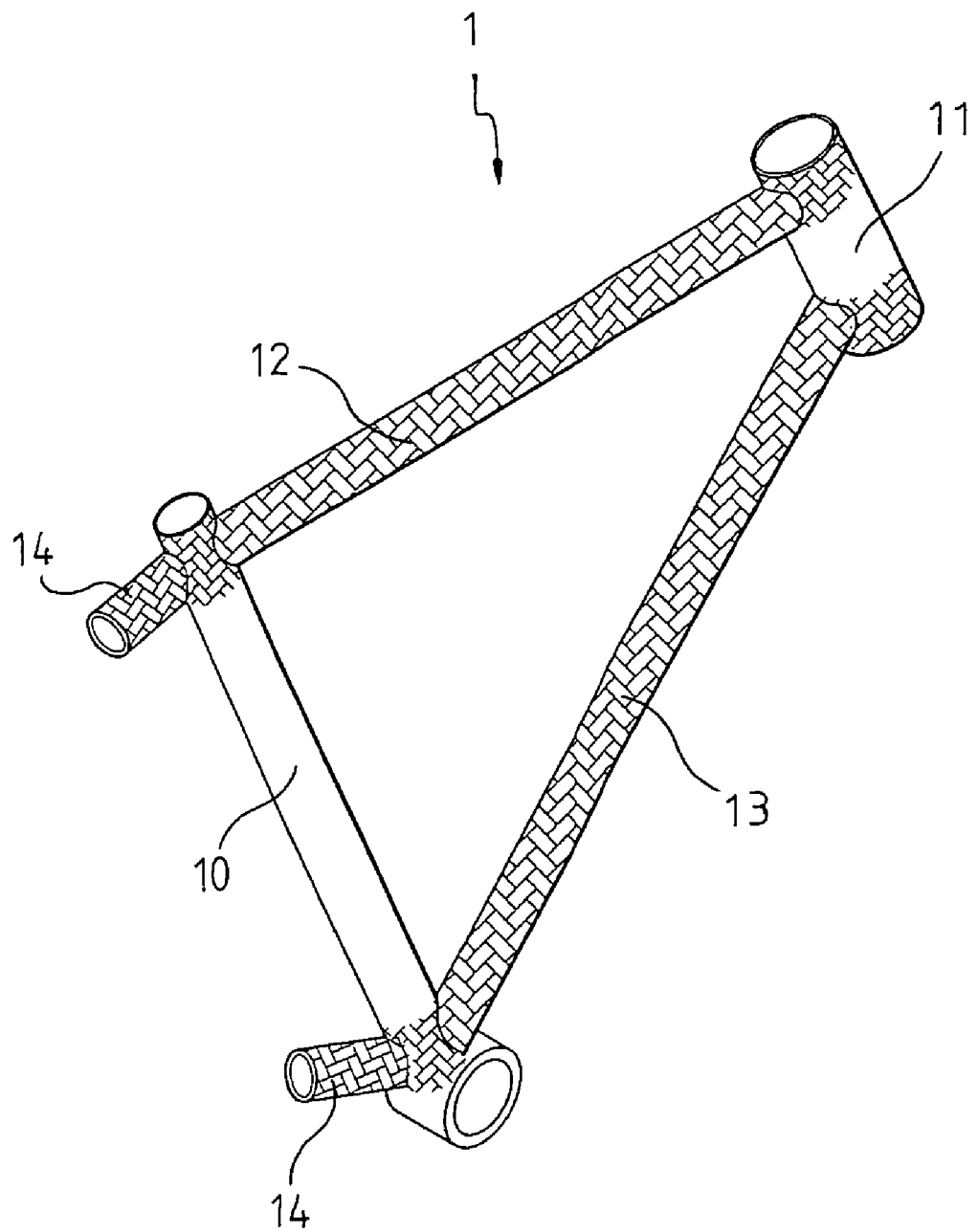
FIG. 7 is a perspective view to show the of the bicycle frame of the present invention.

As shown in FIG. 7, the bicycle frame 1 made by the method of the present invention includes an aluminum seat tube 10, an aluminum head tube 11, a carbon-fiber top tube 12 and a carbon-fiber down tube 13. The two connection ends 14 are to be connected with seat stay and chain stay.

Figure 8:
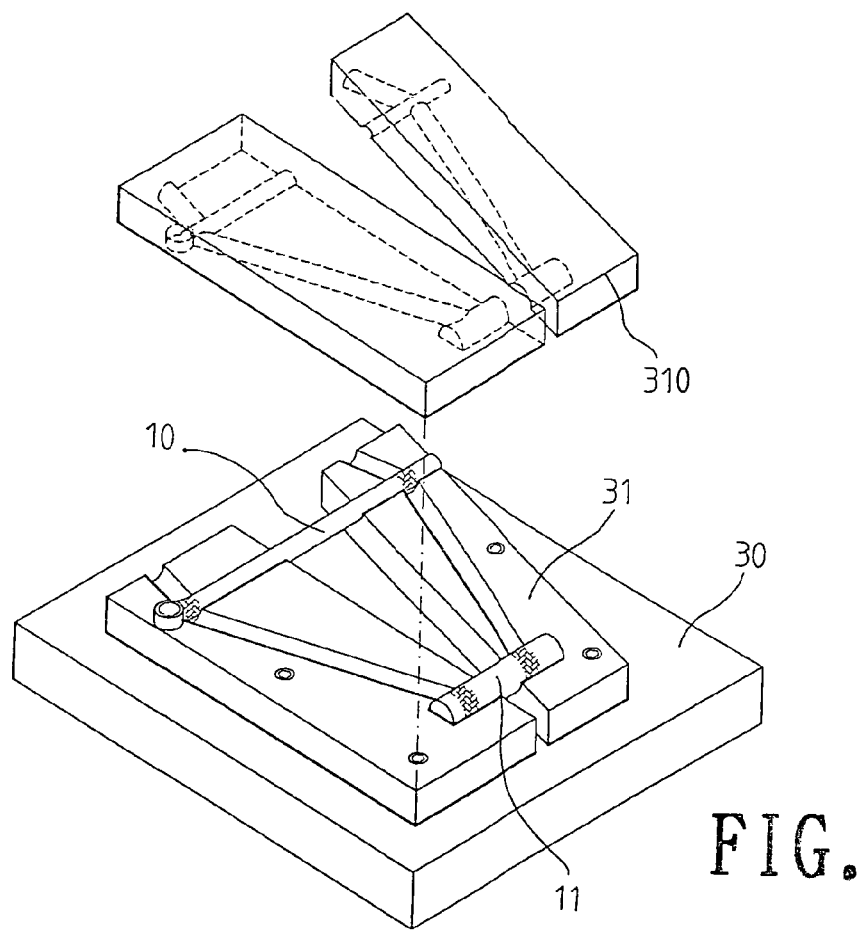
FIGS. 8 and 9 show the movable mold parts are arranged to make another bicycle frame.
Figure 9:
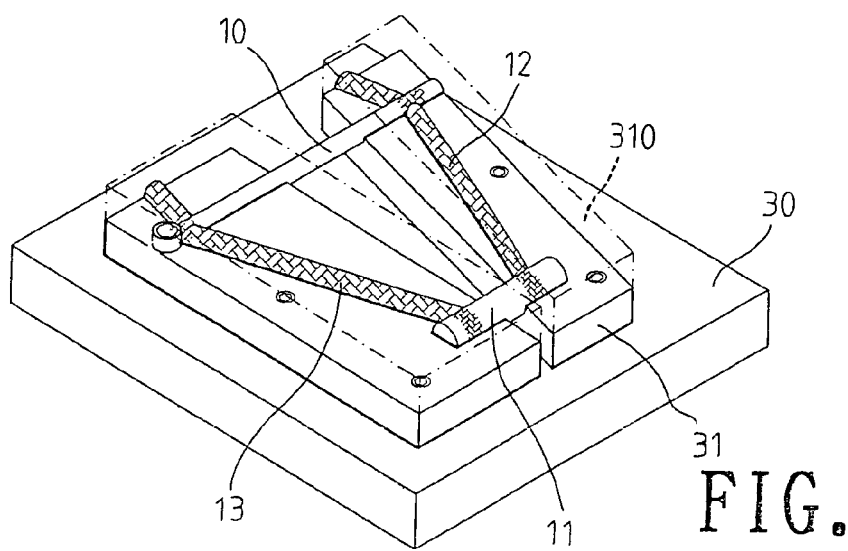

As shown in FIGS. 8 and 9, the distance between the two first and second movable parts 31, 310 can be arranged to be shorter or longer so that the length of the seat tube 10 an the head tube 11 can be made shorter or longer. By the arrangement, the bicycle frames of different sizes can be easily made without preparing a larger and new mold set.

While we have shown and described the embodiment in accordance with the present invention, it should be clear to those skilled in the art that further embodiments may be made without departing from the scope of the present invention.

What is claimed is:

1. A method for making bicycle frames, comprising the steps of: providing two first movable mold parts on a base board and each first movable mold part having concavities;

providing a seat tube and a head tube into the concavities of the first movable mold parts;

providing a top tube and a down tube via wrapping carbon-fiber sheets;

connecting the top tube and the down tube between the seat tube and the head tube;

wrapping carbon-fiber sheets on the seat tube to form two connection ends;

mounting two second movable mold parts on the first movable mold parts and the second movable mold parts having concavities corresponding to the concavities in the first movable mold parts so that two ends of the seat tube and two ends of the head tube are located in the first and second movable mold parts; and blowing air into the top tube, down tube and the two connection ends to inflate the carbon-fiber sheets to contact against inner peripheries of the concavities under high temperature and pressure, the carbon-fiber sheets being solidified.

2. The method as claimed in claim 1, wherein the seat tube and the head tube are made of aluminum.

* * * * *